United States Patent
VanValkenburgh

(10) Patent No.: US 8,371,598 B2
(45) Date of Patent: Feb. 12, 2013

(54) WIDTH ADJUSTER FOR MOTORCYCLE STAND

(75) Inventor: Charles N. VanValkenburgh, Huntsville, AL (US)

(73) Assignee: Innovation First, Inc., Greenville, TX (US)

( * ) Notice: Subject to any disclaimer, the term of this patent is extended or adjusted under 35 U.S.C. 154(b) by 193 days.

(21) Appl. No.: 13/009,436

(22) Filed: Jan. 19, 2011

(65) Prior Publication Data

US 2012/0181776 A1    Jul. 19, 2012

(51) Int. Cl.
*B62H 3/10*    (2006.01)
*B25B 13/06*   (2006.01)

(52) U.S. Cl. ......... 280/293; 81/124.3; 211/22; 254/131; 254/422; 411/533

(58) Field of Classification Search ............ 280/304, 280/293, 304.5; 211/20, 22; 254/131, 134, 254/422; 411/531, 533, 372.5, 371.2, 372, 411/344, 390, 398, 401, 405, 119, 120
See application file for complete search history.

(56) References Cited

U.S. PATENT DOCUMENTS

| | | | |
|---|---|---|---|
| 605,482 A * | 6/1898 | Jaggard | 215/302 |
| 657,075 A * | 9/1900 | Ball | 81/10 |
| 776,325 A | 11/1904 | Hodge | |
| 851,428 A * | 4/1907 | Morrill | 81/124.3 |
| 866,279 A * | 9/1907 | Jenkins | 411/90 |
| 1,108,602 A * | 8/1914 | Mentzer | 81/10 |
| 1,133,279 A | 3/1915 | Gross | |
| 1,384,655 A * | 7/1921 | Allmon | 81/124.3 |
| 1,832,185 A * | 11/1931 | Cochrane | 81/124.3 |
| 2,305,274 A * | 12/1942 | Power | 81/124.3 |
| 2,733,937 A * | 2/1956 | Mowrer | 285/39 |
| 2,769,360 A * | 11/1956 | Cottrell et al. | 81/124.3 |
| 4,008,822 A | 2/1977 | Carroll | |
| D412,833 S * | 8/1999 | Cassel | D8/399 |
| 5,971,360 A * | 10/1999 | Sinsley | 254/8 B |
| D435,765 S * | 1/2001 | Owens et al. | D8/28 |
| 6,308,423 B1 | 10/2001 | Ono | |
| 6,488,157 B2 * | 12/2002 | Chen | 211/20 |
| 6,860,625 B2 | 3/2005 | Bronchak | |
| 7,100,928 B1 | 9/2006 | VanValkenburgh | |
| 2006/0240676 A1 | 10/2006 | Orange et al. | |
| 2010/0206021 A1 | 8/2010 | Tribout et al. | |

* cited by examiner

*Primary Examiner* — Anne Marie M Boehler
(74) *Attorney, Agent, or Firm* — Adam K. Sacharoff

(57) ABSTRACT

The leverage device is intended to be installed on motorcycle stands that currently use a hex head machine screw for width adjustment. It consists of a) a female hex portion to mate with the hex head of the machine screw, b) a lever portion to be actuated by the user and c) a flat bottom to keep it captive to the machine screw. The device allows the user to loosen the screw slightly for width adjustment then re-tighten it without the use of tools. The low profile device is installed on the motorcycle stand to become a permanent part of the stand, unlike a wrench that is separate.

7 Claims, 11 Drawing Sheets

WIDTH ADJUSTER FOR MOTORCYCLE STAND

BACKGROUND OF THE INVENTION

The present invention relates generally to motorcycle stands. More particularly, this invention pertains to a method of adjusting a motorcycle stand from side to side to accommodate various widths of motorcycles. The invention requires no tools to operate and securely fixes the motorcycle stand at the desired width.

Referring to FIGS. 1 through 3, there is shown a rear motorcycle stand 5 used for raising the rear of a motorcycle 2 off the ground for maintenance. A rear motorcycle stand raises the rear of the motorcycle high enough off the ground for maintenance including rear wheel removal while keeping the motorcycle oriented vertically as viewed from the front or rear. Most rear motorcycle stands consist of a main chassis 10 with an upright structural member 12 on each side. On top of each structural member 12 rests a top support 14 that engages the motorcycle swing arm near the rear axle. The top supports 14 often have accommodations for width adjustment 16.

One common prior art method for width adjustment 16 involves a square tube 18 permanently fixed to the upright structural member 12. A slightly smaller square tube 20 or square solid member is part of the top support 12 that includes a support plate 21 for engaging the motorcycle swing arm. The smaller square member 20 is allowed to move side-to-side with respect to the larger square tube 18. The larger square tube 18 has a female threaded member permanently affixed to it. A screw 22 penetrates the threaded member that can be tightened against the smaller square member 20 to prevent side-to-side motion of the top support 14 to accommodate the width of the motorcycle. Typically, a knob 24 is integrated into the screw allowing width adjustment to be made without tools. A disadvantage of this method is that a loose fit often exists between the larger square tube and smaller square member. This results in a top support that does not securely hold the motorcycle. Pit Bull brand motorcycle stands have used the same method of width adjustment since 1994. Since that time, several other brands have used the same method. The Pit Bull method utilizes a vertically oriented hex head machine screw 26 threaded into the top of the upright structural member 12 to hold the top support 14 in position. To facilitate width adjustment and prevent the top support 14 from rotating, the top support 14 consists of two parallel bars 28 that fit around a raised guide (shown in FIG. 6) on the upright structural member 12. To adjust width, the screw 26 is loosened slightly and the top support 14 is slid to the desired position and then the screw 26 is re-tightened.

The Pit Bull system has two advantages over the square tube system. First, the top support is held very securely once the screw 26 is tightened. Second, the outboard placement of the hex head machine screw allows the top support to be adjusted to a wider position. A disadvantage of the Pit Bull system is that a wrench is required to loosen and re-tighten the bolt.

BRIEF SUMMARY OF THE INVENTION

The present invention is a leverage device that allows the hex head machine screw to be loosened and re-tightened using hand force only. The device allows complete width adjustment of a rear stand with no tools. Its shape conforms to the hexagonal-shaped head of the machine screw and has a protruding lever for hand actuation. it has a flat bottom with a through-hole that allows the screw head to retain it. It is a permanent part of the stand yet can be retrofitted to existing stands with no further alterations. If additional torque is desired, such as for a user with no desire to adjust the width of his motorcycle stand, the device can be over-ridden with a wrench or other leverage device. It is low profile so it does not interfere with operation of the stand. Since it is an integral part of the motorcycle stand, it does not have to be retrieved for use and therefore cannot get lost.

The present invention has potential for wide spread applications in that it can be incorporated wherever it is desirable to tighten and loosen a screw without the use of tools. Other details and advantages of the present system are apparent in the following description, accompanying drawings and the claims.

BRIEF DESCRIPTION OF THE DRAWINGS

A fuller understanding of the foregoing may be had by reference to the accompanying drawings, wherein.

DETAILED DESCRIPTION OF THE INVENTION

Figure 1:
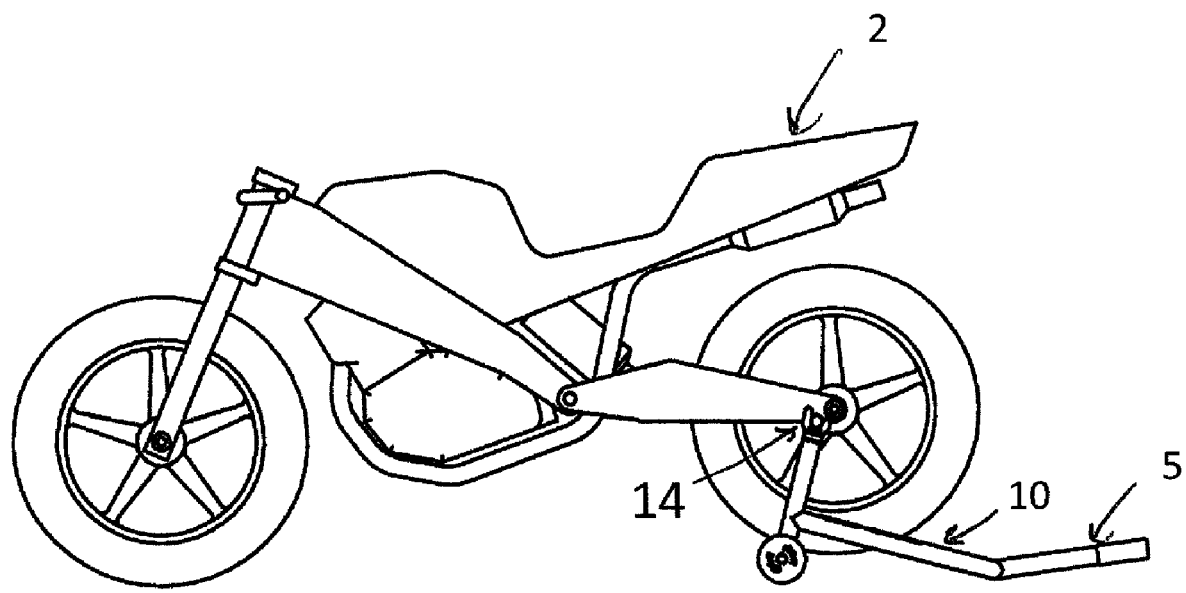
FIG. 1 is a side view of a motorcycle on a prior art rear motorcycle stand.
Figure 2:
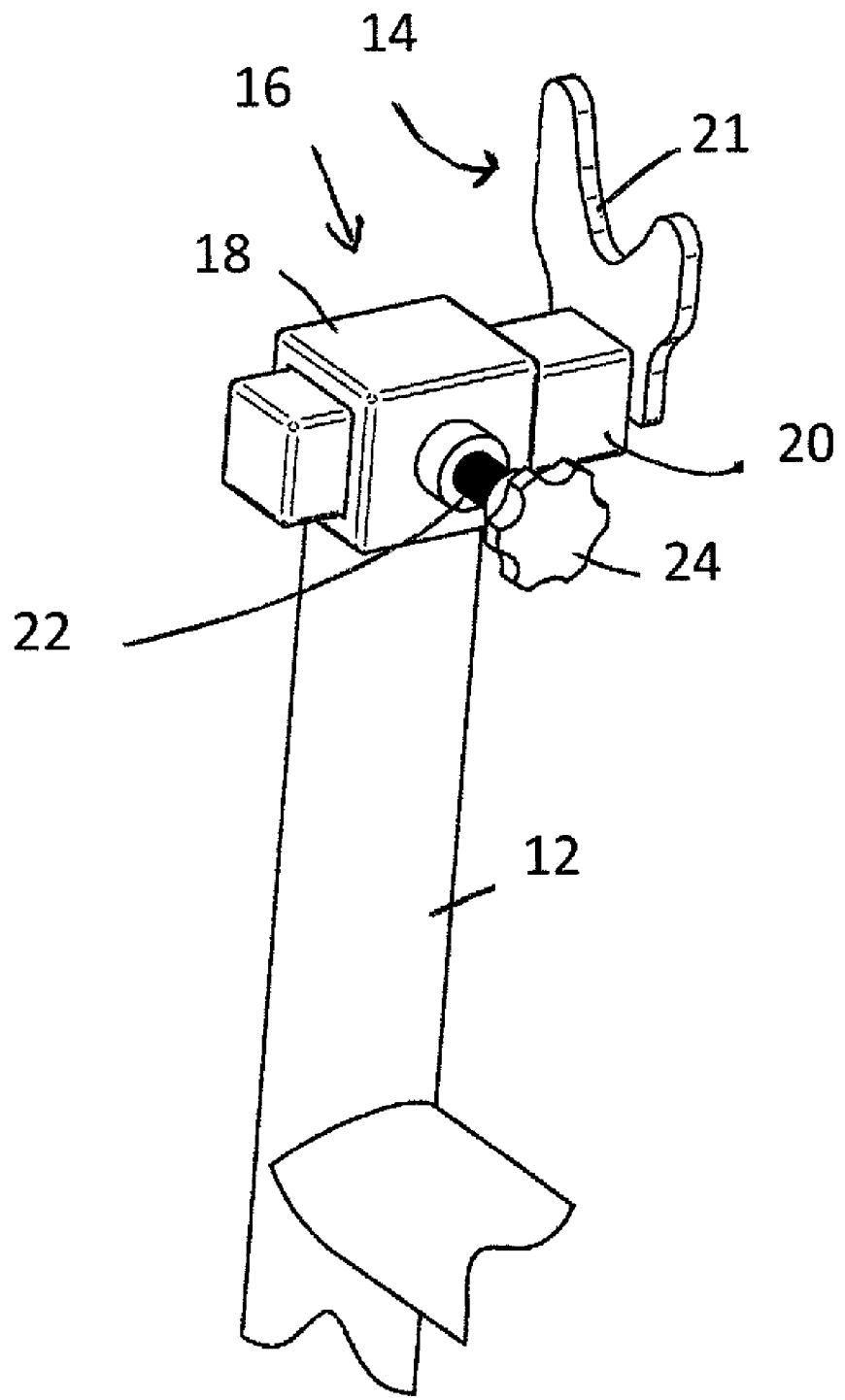
FIG. 2 is a prior art method of width adjustment for a rear motorcycle stand.
Figure 3:
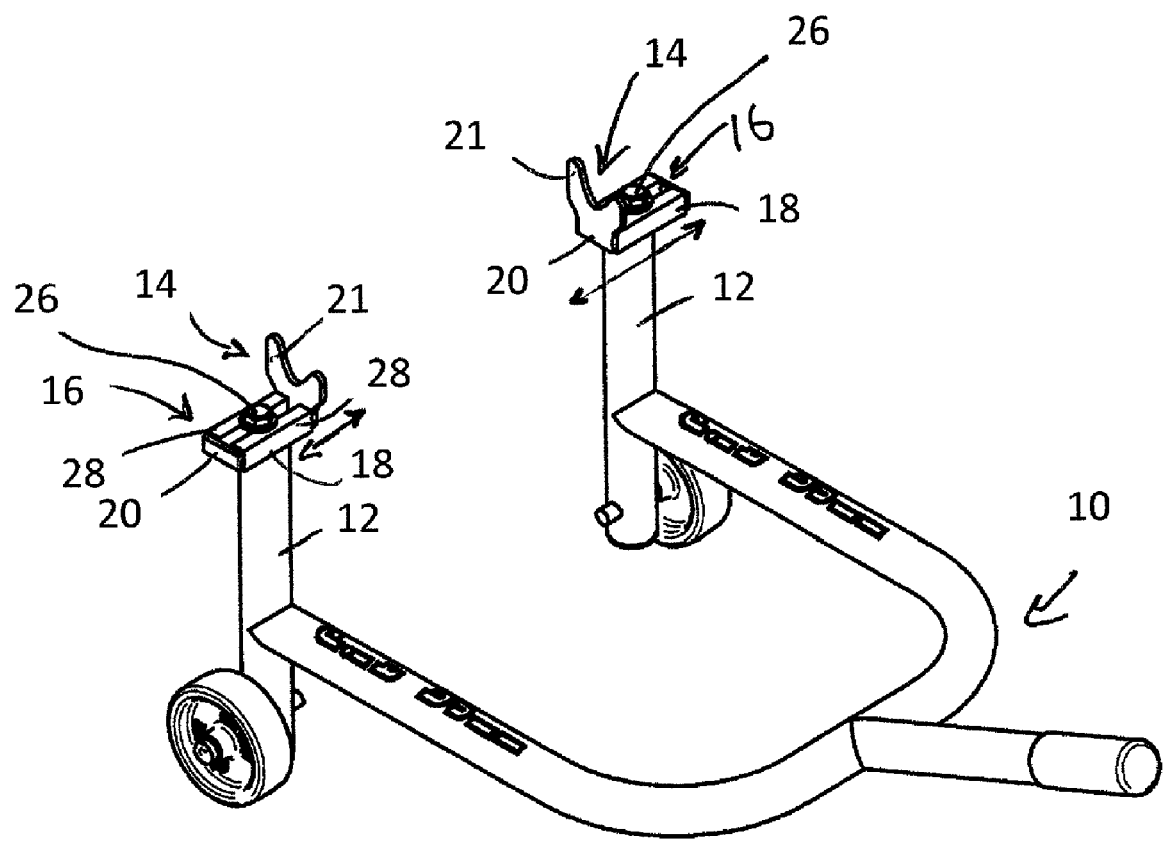
FIG. 3 is a prior art motorcycle stand.
Figure 4:
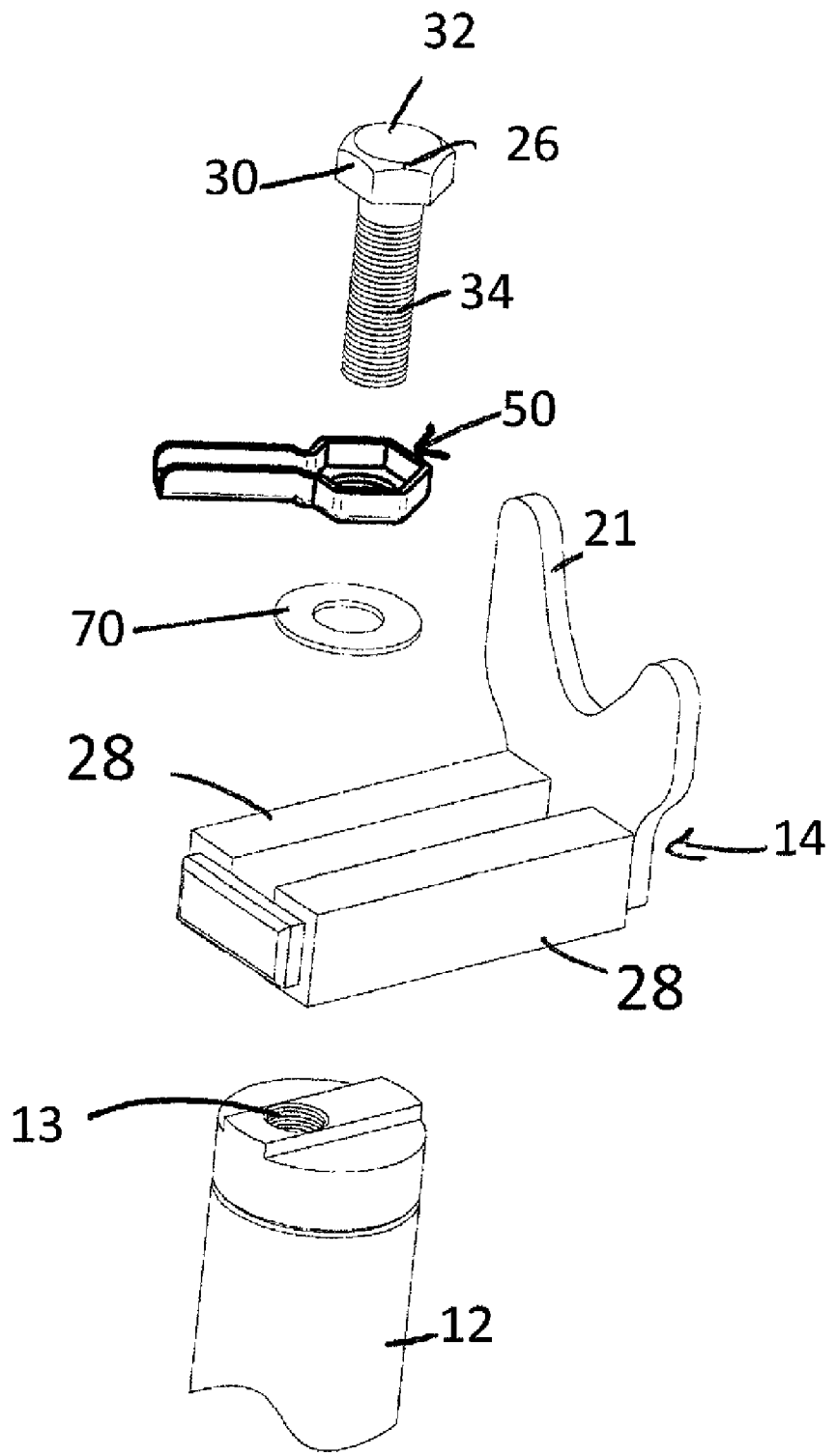
FIG. 4 is an exploded view showing the relationship of the present invention to a rear motorcycle stand.
Figure 5A:
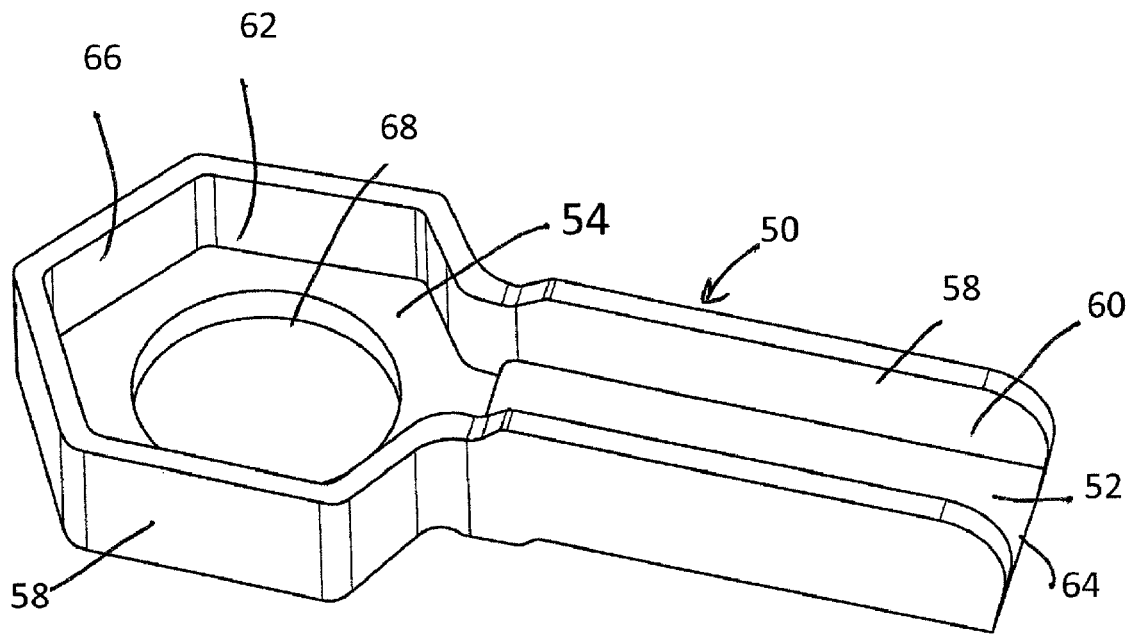
FIG. 5A is a top perspective view of the leverage device according to an embodiment of the present invention.
Figure 5B:
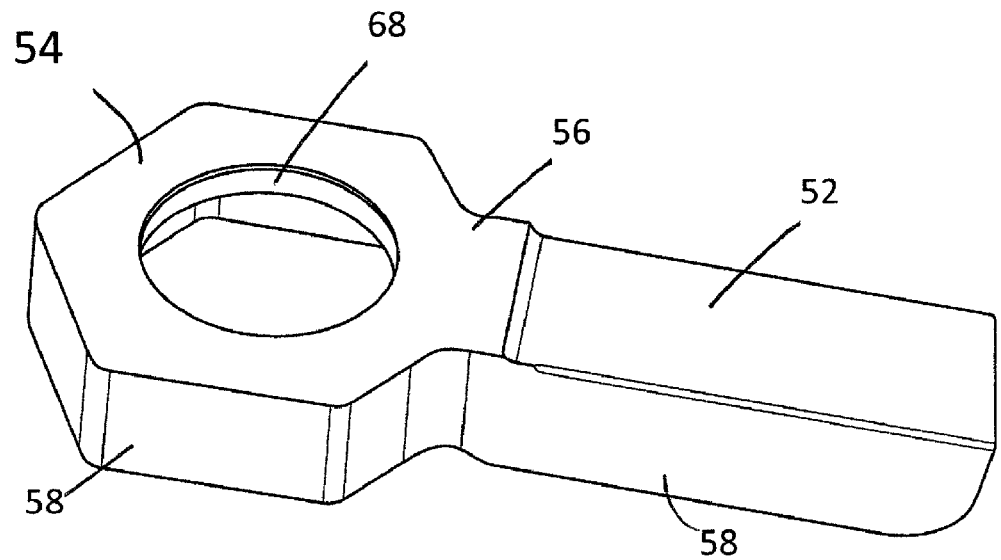
FIG. 5B is a bottom perspective view of the leverage device according to an embodiment of the present invention.
Figure 5C:
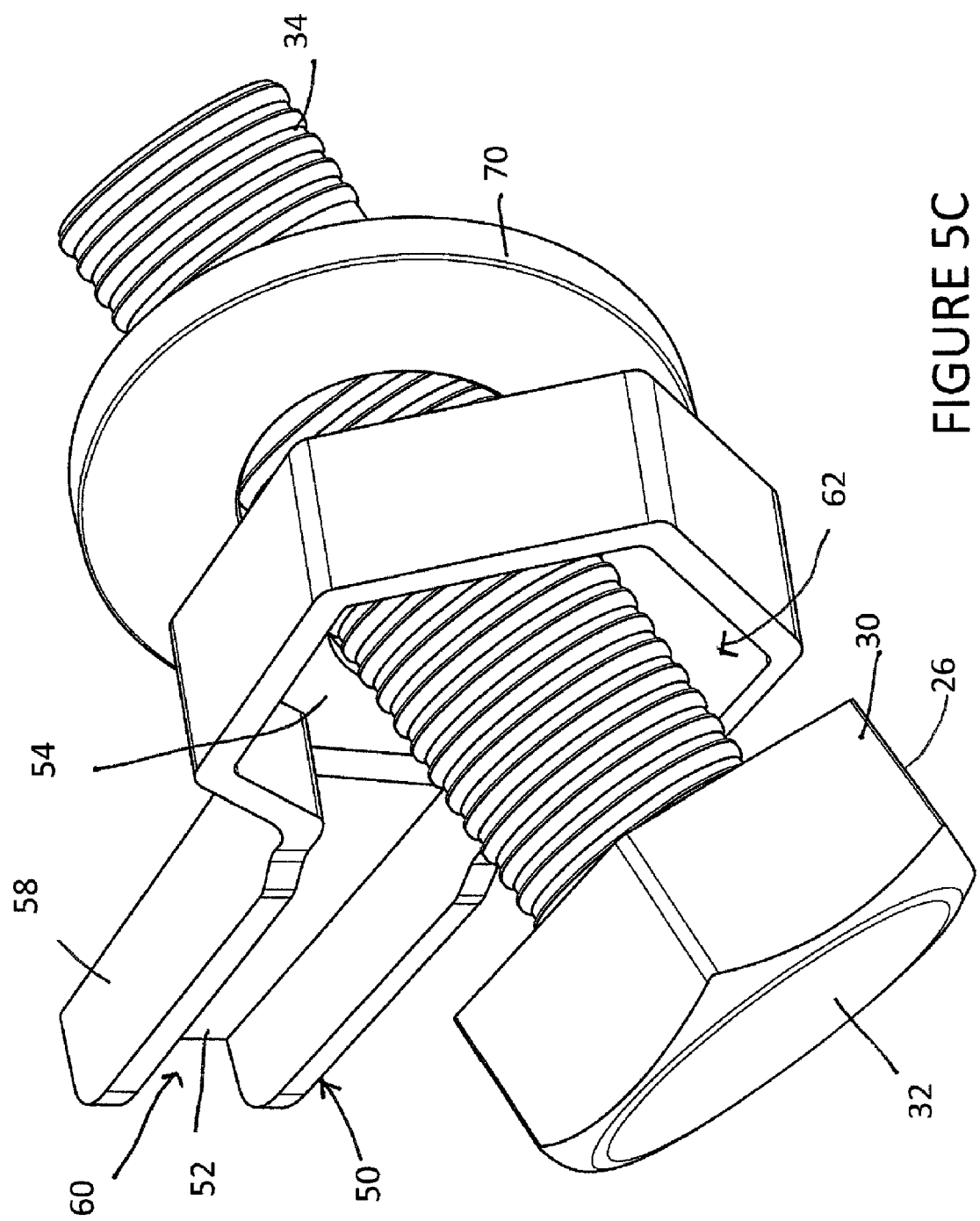
FIG. 5C is a perspective view of the leverage device, hex head screw and washer placed in an assembly configuration.

The present invention is new device for use on rear motorcycle stands as configured under the brand Pit Bull and in use since 1994. Referring now to FIGS. 4 through 6B, the invention is a leverage device 50 that allows the motorcycle stand to be adjusted without tools. The leverage device 50 is a retro-fit device that installs around the hexagonal sides 30 of a hex head 32 machine screw 26. The leverage device 50 is uniquely tailored to meet the needs of the motorcycle stands in two ways. First, the device 50 has a low profile in that it does not extend taller that the screw head. The low profile design is necessary to allow clearance between the motorcycle and the motorcycle stand. Second, it has a lever 60 intended for rotations of ⅛ to ¼ turns. A relatively long lever would not be ideal for applications requiring continuous rotations due to limited side clearance but suits itself well to the specific motorcycle stand designs since only short strokes are needed to loosen/tighten the top support screw.

The leverage device 50 is defined by having a device head 54 and a device lever 52 extending or radiating from the device head in a substantially straight plane. The leverage device 50 includes a substantially flat bottom portion 56, which permits the device 50 to be captive relative to the screw 26, such that the bottom portion 56 has limited relative rocking motion in relation to the top section of the top support 14 and more specifically to the two of the two parallel bars 28 (as shown in greater detail below). Extending from the bottom portion 56, the leverage device 50 includes side walls 58 that form a channel 60 along the device lever 52 and form a enclosed head space 62 around the device head 54. At the distal end of the device lever 52 there is an opening 64 formed, the use thereof is described in greater detail below. The enclosed head space 62 has an interior wall profile 66 that is shaped to engage or lock against the hex head 32 of the machine screw 26, such that rotation of the leverage device 50 will rotate the screw 26 in either a locking or unlocking direction. A hole 68 is positioned in the bottom portion 56 about the device head 54 to permit the threaded section 34 of the screw 26 to pass there through such that the screw can operate normally. When inserted through the hole 68 the hex head 32 rests within the enclosed head space 62 and the threaded section 34 will be permitted to engage the threaded section 13 of the upright structural member 12.

A flat washer 70 is preferred under the bottom portion 56 of the leverage device 50 to prevent it from galling with respect to the top support 14 of the motorcycle stand.

Figure 6A:
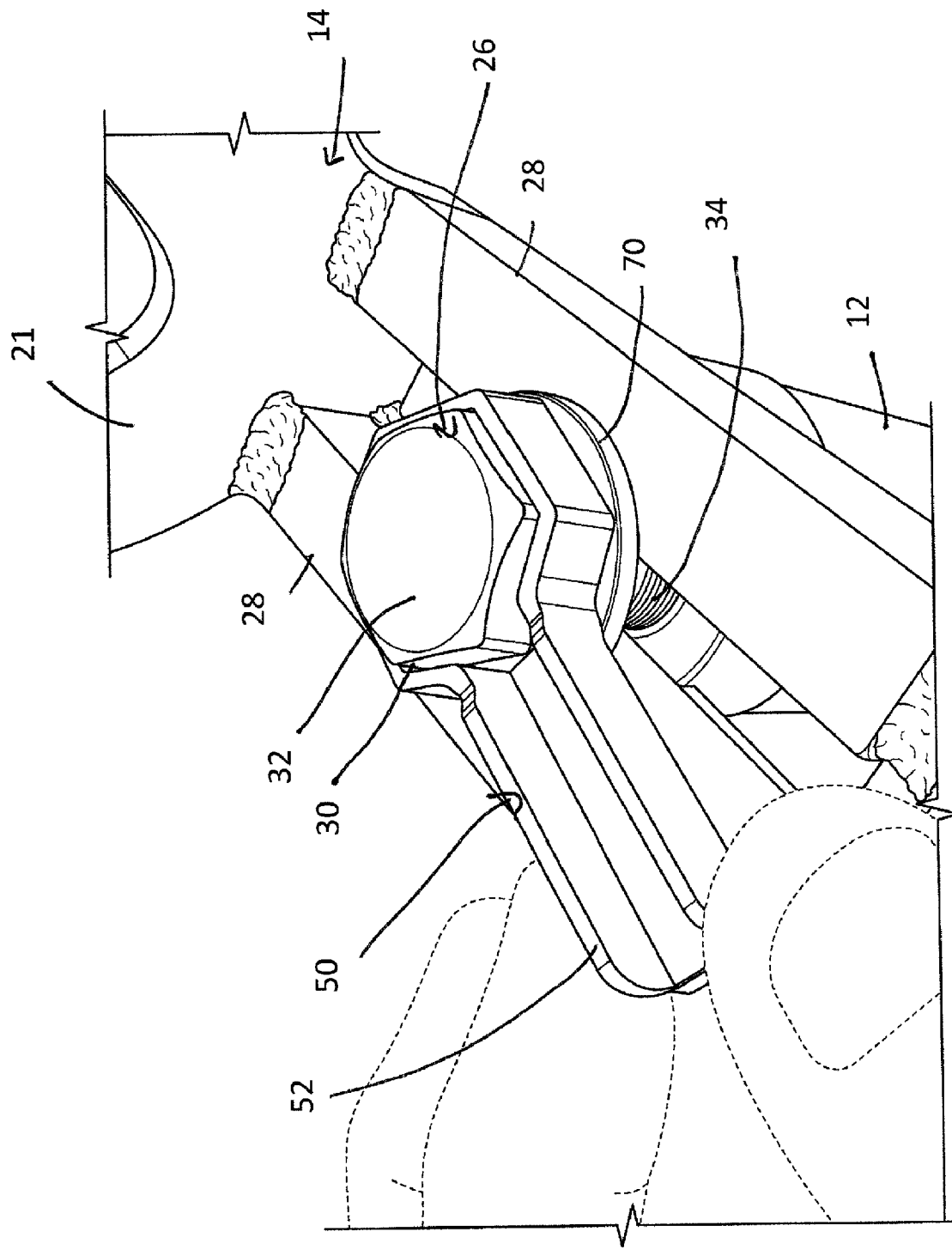
FIGS. 6A and 6B is a perspective view of an embodiment of the present invention shown in an assembled configuration
Figure 6B:
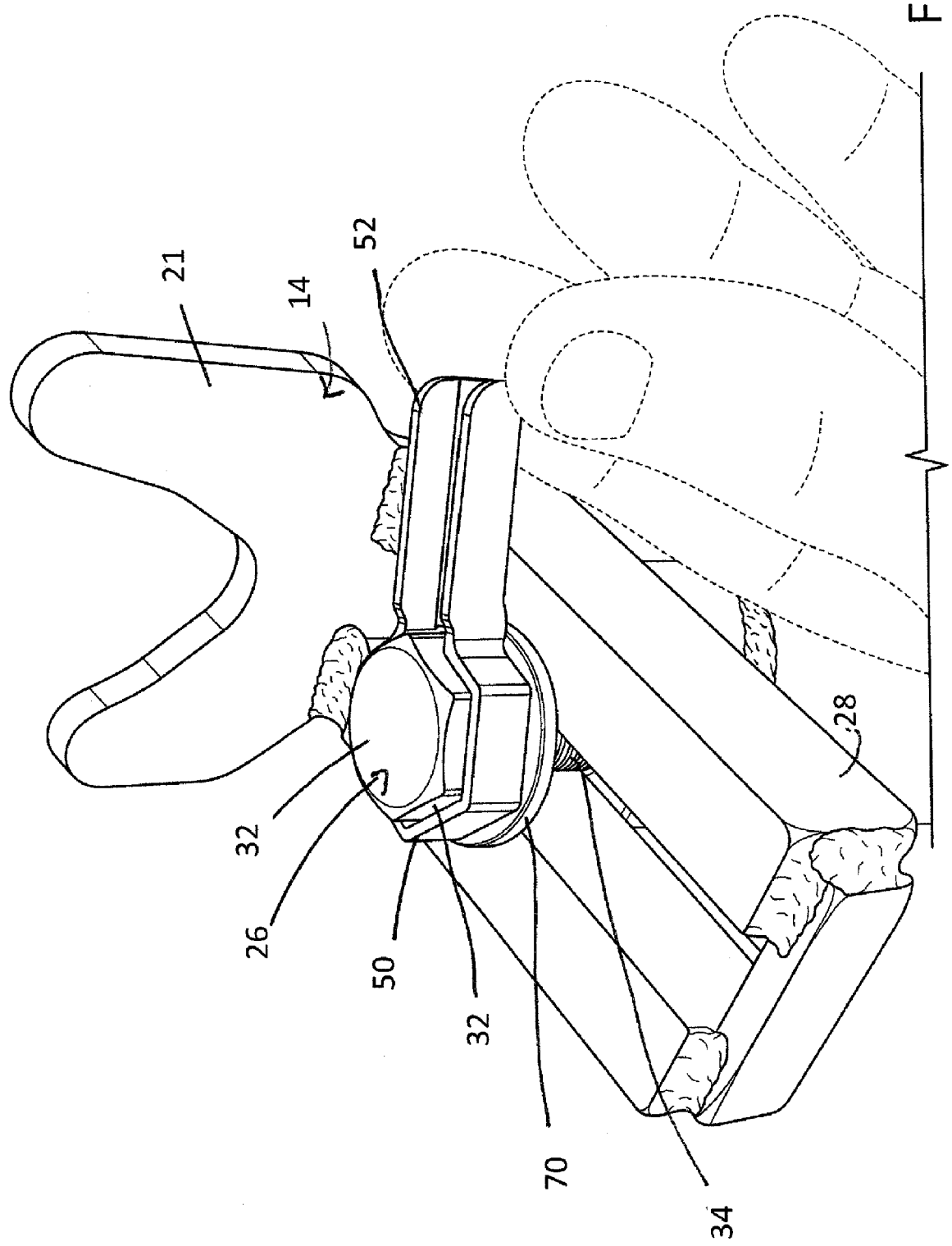

As shown in FIGS. 6A and 6B the leverage device 50 is shown secured with the hex head screw to the top support 14. As noted herein, a user can tighten and loosen the hex head screw by rotating the leverage device. This is due to the fact that the device arm extends a predetermined length such that a user is able to rotate the device head. Rotation as small as about ⅛ to ¼ turn can be accomplished and is in most circumstances all that is needed for loosening and tightening the hex head screw.

Figure 7:
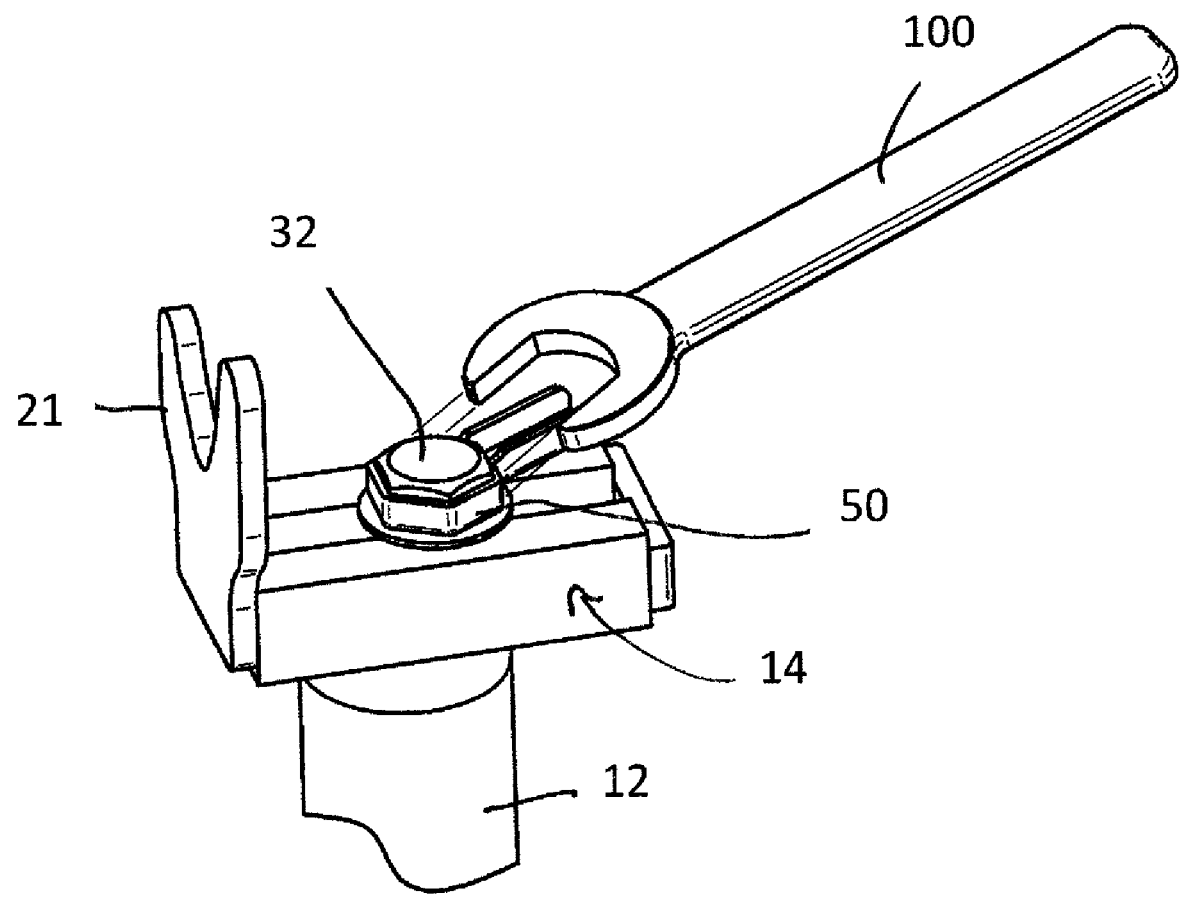
FIG. 7 is a view showing a large wrench used to exert additional force to invention.
Figure 8:
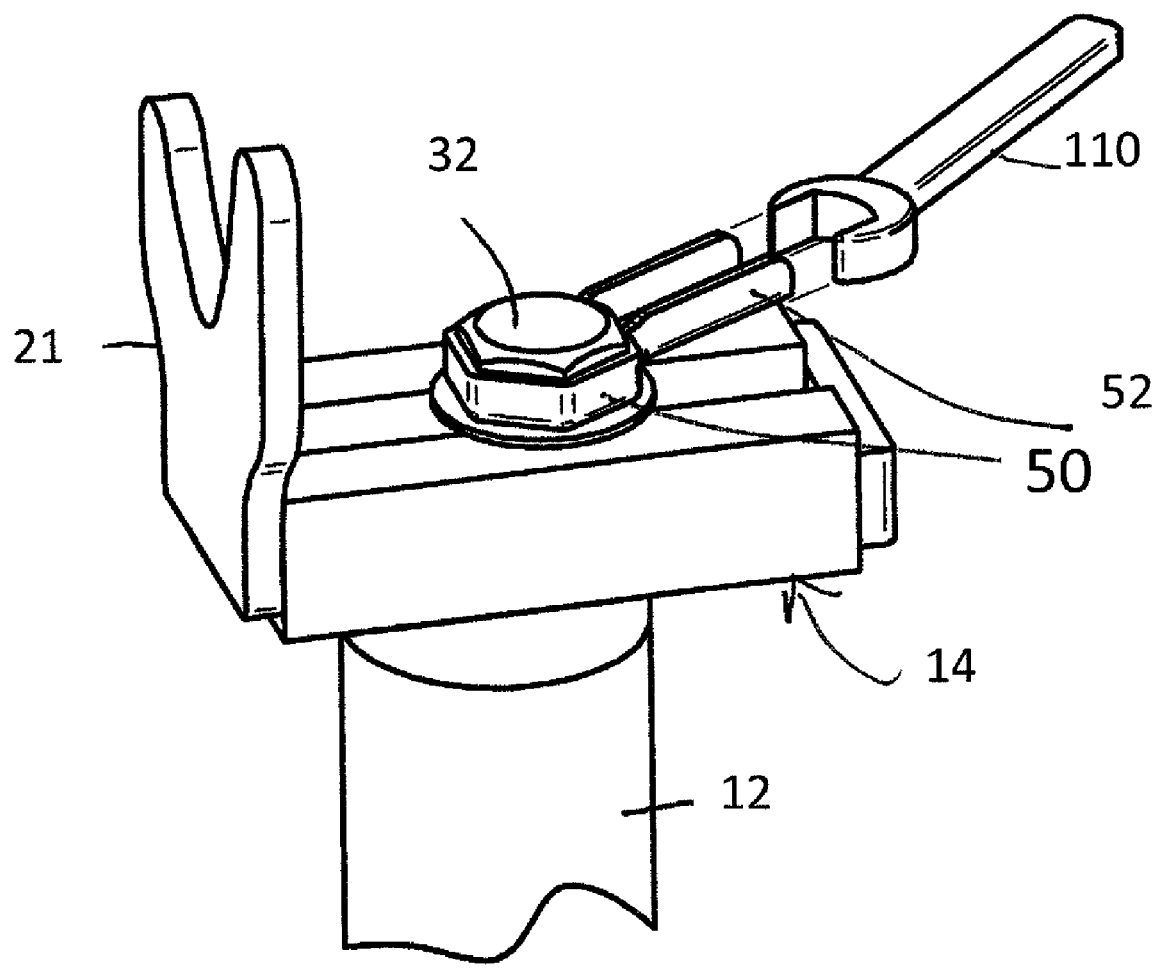
FIG. 8 is a view showing a small wrench used to exert additional force to invention.
Figure 9:
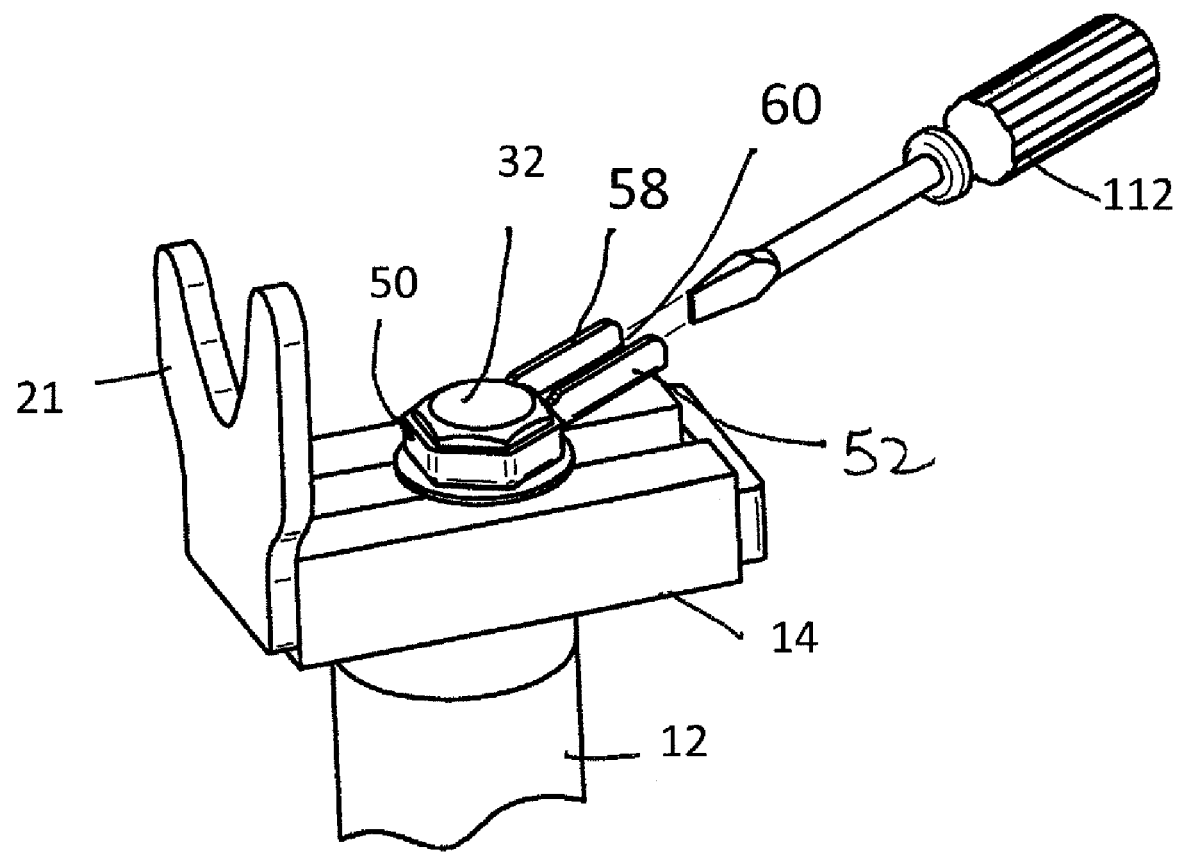
FIG. 9 is a view showing a screwdriver used to exert additional force to invention.

A tool can be used in conjunction with the present invention to exert additional force, if desired. There are three different ways to apply additional force to the device as shown in FIGS. 7, 8 and 9 as described. First, a large wrench 100 fits around the device head 54 of the leverage device 50; second, a smaller wrench 110 fits around the device lever 52 of the leverage device 50; and third, a screwdriver 112 or similar leverage device fits between the side walls 58 in the channel 60 of the device lever 52.

As provided by one or more of the embodiments described herein there is provided in one example a motorcycle stand, having a base 10 and a pair of support members 12 connected to and extending outward from the base. Each support member 12 has an adjustable bracket 14 connected thereto by a hex head screw 26. The adjustable brackets 14 include a u-shaped portion and a support plate 21 perpendicularly connected to one end of the u-shaped portion. The u-shaped portion includes two elongated rectangular shaped members 28 spaced apart from and parallel to one another to permit the threaded portion 34 of the hex head screw 26 to slide therethrough for engagement with a threaded portion 13 in the support member 12. Thus the loosening of the hex head screw 26 permits the adjustable bracket 14 to slide laterally towards or away from each other. The improvement in the motorcycle stand 5 comes from the inclusion of a leverage device 50.

The leverage device is positioned between a portion of the hex head screw and the adjustable bracket. The leverage device is defined to include a device head and a device arm extending from the device head. Side walls around peripheries of the device head and device arm form an enclosed head space around a portion of the device head and form a channel along the device arm. The side walls have at least an opening at the end of the device arm distal to the device head. The enclosed head space having an interior wall profile shaped to engage against an exterior surface of a portion of the hex head screw, such that rotation of the enclosed head space will rotate the hex head screw. In additional thereto, the device arm may further radiate from the device head in a substantially straight plane. In other aspects, the device head and device arm may include a substantially flat bottom portion such that the leverage device is captive relative to the adjustable bracket. The flat bottom may further include a hole positioned in the flat bottom portion about the device head permitting the threaded portion of the hex head screw to pass there through for engagement with the threaded portion in the support member. Furthermore, the side walls around the device head may extend to a height less than a height of a top portion of the hex head screw. In other aspects, the interior wall profile of the enclosed head space of the device head may include up to six different engagement positions wherein each engagement position sets the device arm at a different extended position from the hex head screw.

In yet another embodiment of the present invention there is provided a leverage device for use with a hex head screw. The device includes a device head and a device arm extending from the device head. Side walls extend around peripheries of the device head and device lever to form a female hex enclosure around a portion of the device head and to form a channel along the device arm. The side walls may have at least an opening at the end of the device arm distal to the device head, The device head and device arm each include a flat bottom portion with a hole positioned in the flat bottom portion about the device head permitting a threaded portion of the hex head screw to pass there through for engagement with an external threaded member for securing the hex head screw to such external threaded member. The female hex enclosure has an interior wall profile shaped to engage against an exterior surface of a portion of the hex head screw, such that rotation of the enclosed head space will rotate the hex head screw. In other aspects, the device arm extends a predetermined length such that a user is able to rotate the device head about ⅛ to ¼ turn for loosening and tightening the hex head screw.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A motorcycle stand, comprising: a base; a pair of support members connected to and extending outward from the base; each support member has an adjustable bracket connected thereto by a hex head screw, and wherein the adjustable brackets include a u-shaped portion and a support plate perpendicularly connected to one end of the u-shaped portion, the u-shaped portion includes two elongated rectangular shaped members spaced apart from and parallel to one another to permit a threaded portion of the hex head screw to slide there-through for engagement with a threaded portion in the support member; wherein the loosening of the hex head screw permits the adjustable bracket to slide laterally towards or away from each other, the improvement comprising:
   a leverage device positioned between a portion of the hex head screw and the adjustable bracket, the leverage device being defined to include:
   a device head;
   a device arm extending from the device head;
   side walls around peripheries of the device head and device arm to form an enclosed head space around a portion of the device head and to form a channel along the device arm; and the enclosed head space having an interior wall profile shaped to engage against an exterior surface of a portion of the hex head screw, such that rotation of the enclosed head space will rotate the hex head screw.

2. The stand of claim 1, wherein the device arm radiates from the device head in a substantially straight plane.

3. The stand of claim 1, wherein the device head and device arm include a substantially flat bottom portion such that the leverage device is captive relative to the adjustable bracket.

4. The stand of claim 3 further comprising a hole positioned in the flat bottom portion about the device head permitting the threaded portion of the hex head screw to pass there through for engagement with the threaded portion in the support member.

5. The stand of claim 1, wherein the side walls around the device head extend to a height less than a height of a top portion of the hex head screw.

6. The stand of claim 1, wherein the interior wall profile of the enclosed head space of the device head includes up to six different engagement positions wherein each engagement position sets the device arm at a different extended position from the hex head screw.

7. The stand of claim 1, wherein the side walls have at least an opening at an end of the device arm that is distal to the device head.

\* \* \* \* \*

UNITED STATES PATENT AND TRADEMARK OFFICE
CERTIFICATE OF CORRECTION

PATENT NO. : 8,371,598 B2  Page 1 of 1
APPLICATION NO. : 13/009436
DATED : February 12, 2013
INVENTOR(S) : Charles N. VanValkenburgh It is certified that error appears in the above-identified patent and that said Letters Patent is hereby corrected as shown below:

On the title page, item (73) Assignee:
"Innovation First, Inc." should read --Pit Bull Products--.

Signed and Sealed this
Seventeenth Day of September, 2013

Teresa Stanek Rea
*Deputy Director of the United States Patent and Trademark Office*